(No Model.)  
3 Sheets—Sheet 1.
B. F. STOCKFORD.
HEATING STOVE.
No. 303,336. Patented Aug. 12, 1884.
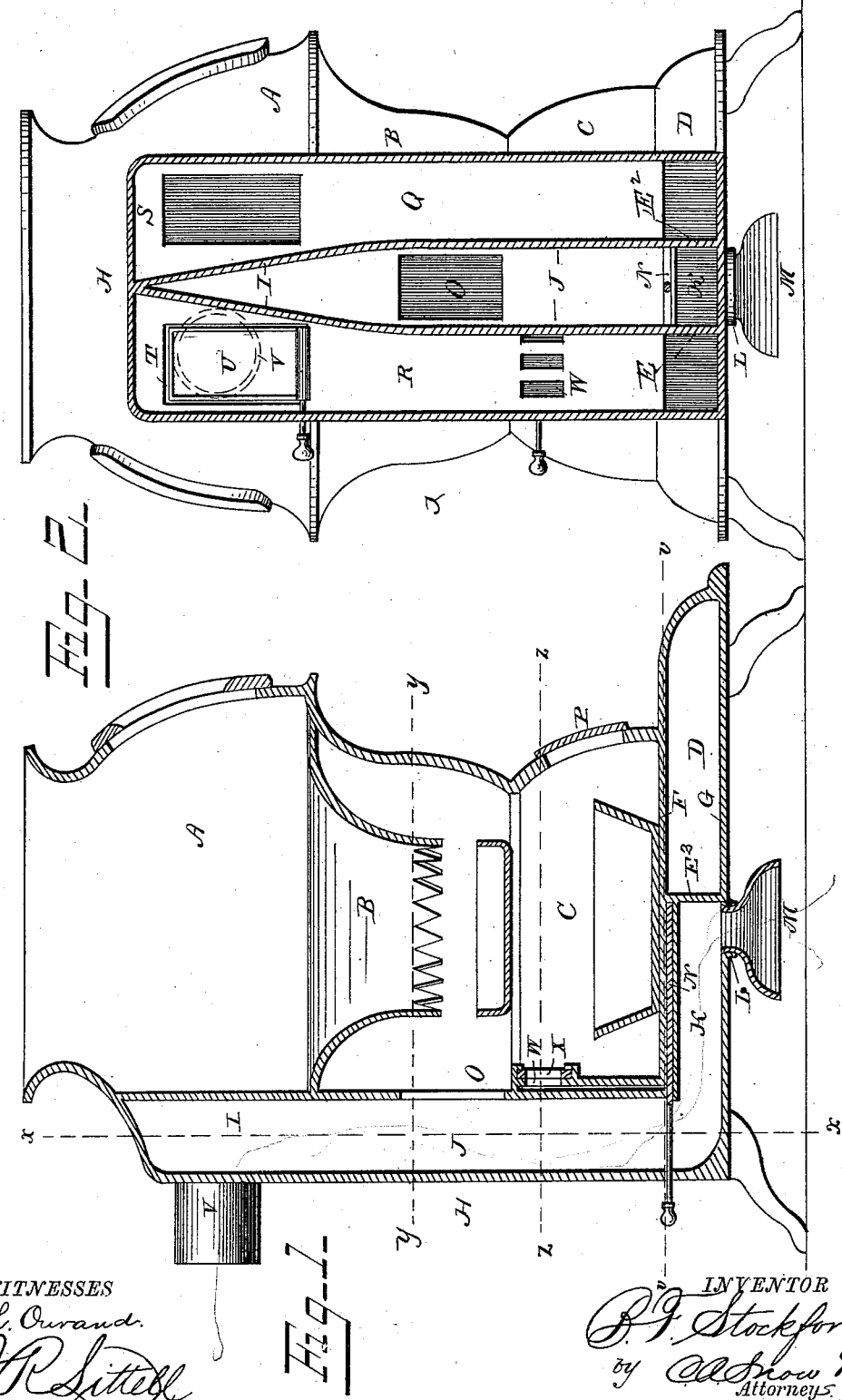
WITNESSES  
F. L. Ourand.  
J. R. Littell
INVENTOR  
B. F. Stockford  
by A. Snow & Co.  
Attorneys
N. PETERS, Photo-Lithographer, Washington, D. C.

(No Model.) 3 Sheets—Sheet 2.

B. F. STOCKFORD.
HEATING STOVE.

No. 303,336. Patented Aug. 12, 1884.

WITNESSES
F. L. Ourand
J. R. Littell

B. F. Stockford
INVENTOR
by C. A. Snow & Co.
Attorneys.

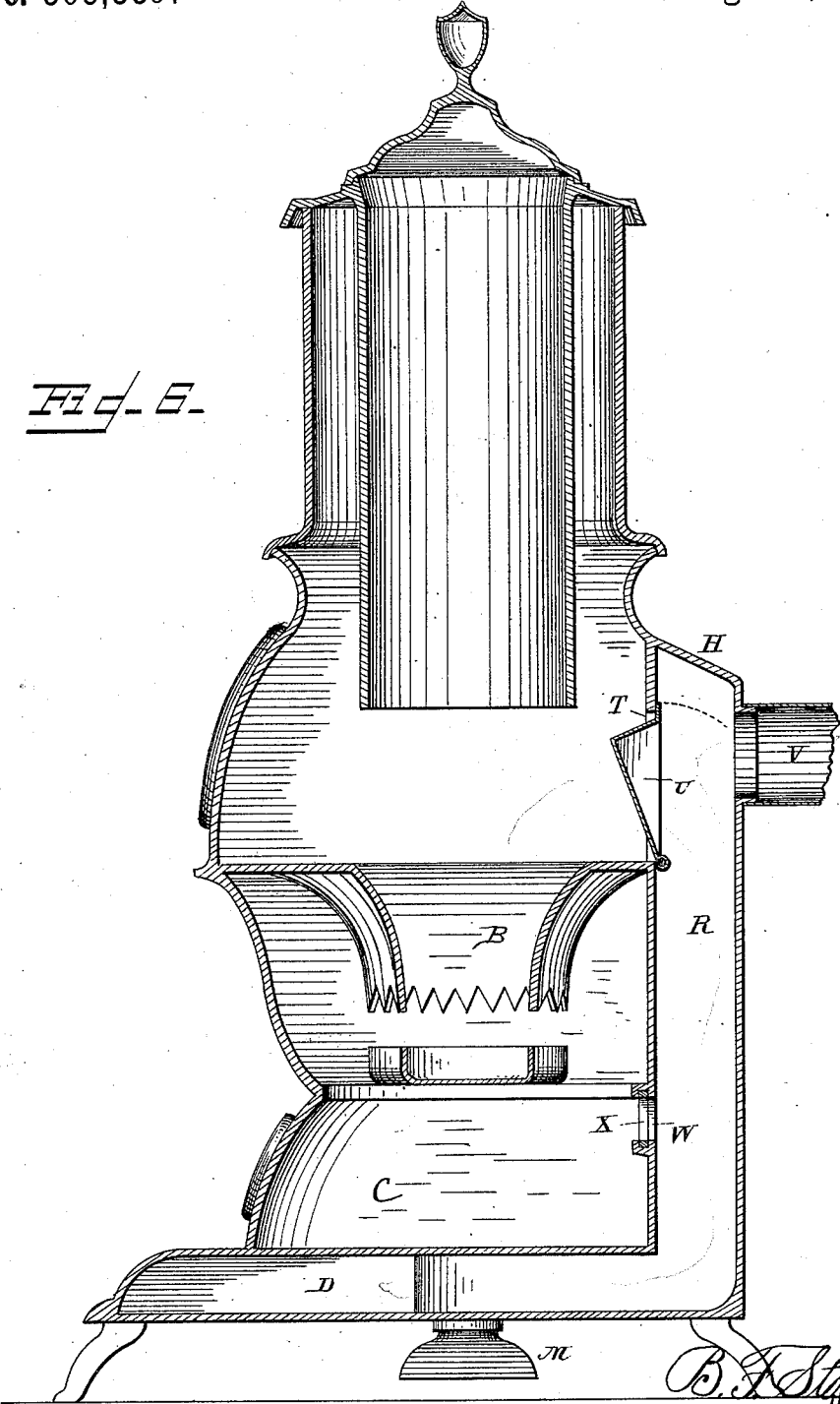

United States Patent Office.

BENJAMIN F. STOCKFORD, OF STURGIS, MICHIGAN.

HEATING-STOVE.

SPECIFICATION forming part of Letters Patent No. 303,336, dated August 12, 1884.

Application filed February 26, 1883. (No model.)

*To all whom it may concern:*

Be it known that I, BENJAMIN F. STOCKFORD, a citizen of the United States, residing at Sturgis, in the county of St. Joseph and State of Michigan, have invented a new and useful Heating-Stove, of which the following is a specification, reference being had to accompanying drawings.

This invention relates to certain improvements in heating-stoves; and it has for its main object to improve the efficiency of the same by increasing the radiating-surface, and securing an improved draft by a novel arrangement of flues.

Figure 3:
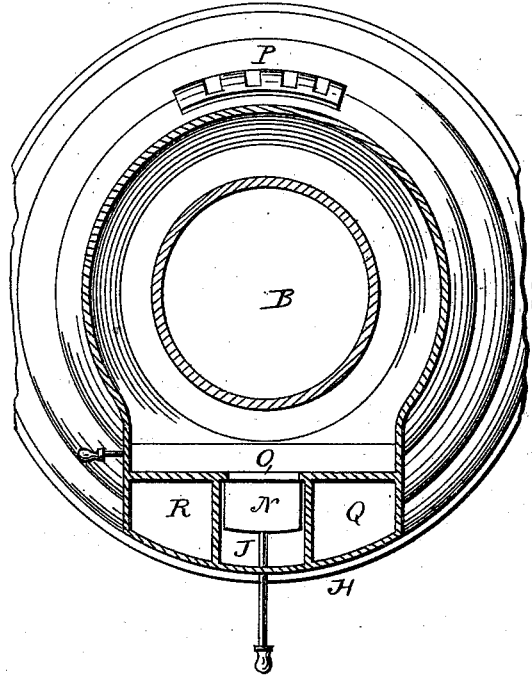
Figure 4:
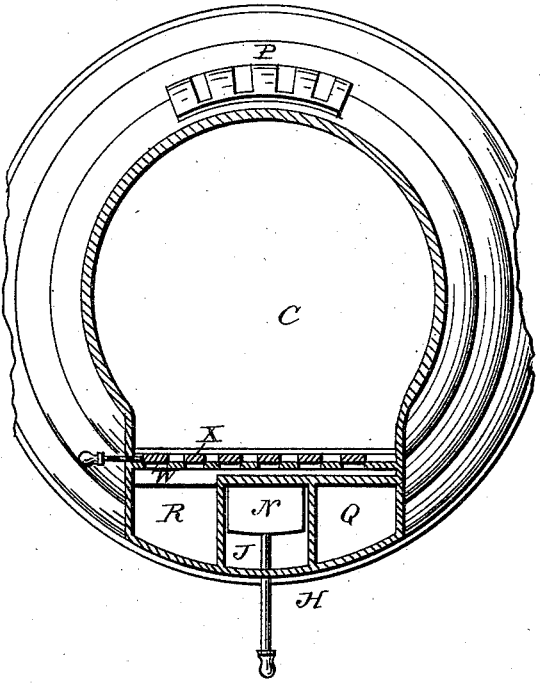
Figure 5:
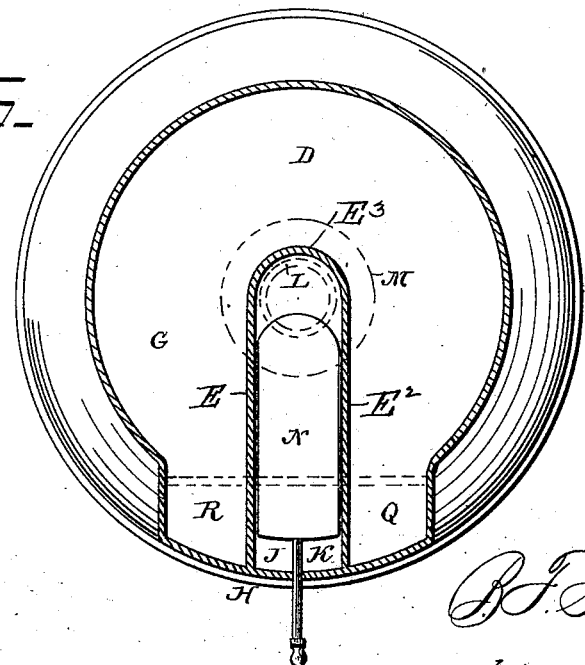

In the drawings, Figure 1 is a vertical sectional view of the lower portion of a heating-stove embodying my improvements. Fig. 2 is a vertical sectional view of the same, taken on the line $x$ $x$ of Fig. 1. Fig. 3 is a horizontal sectional view taken on the line $y$ $y$ of Fig. 1. Fig. 4 is a horizontal sectional view taken on the line $z$ $z$ of Fig. 1. Fig. 5 is a horizontal sectional view taken on the line $v$ $v$ of Fig. 1, and Fig. 6 is a vertical sectional view taken through the pipe $v$ and chamber $u$.

A represents the shell or body of a heating-stove; B, the fire-pot; C, the ash-pit; D, the bottom chamber, and H the rear vertical chamber. The bottom or horizontal chamber, D, leads into the vertical chamber H, to establish a communication, as shown in Figs. 1 and 6 of the drawings. The bottom chamber, D, (see Figs. 2 and 5,) is divided into compartments by means of the partition parallel walls E E², extending from the rear wall of the stove to about the center of the said chamber, where they are connected by the front wall, E³. These walls E E² E³, which extend from the bottom to the top of the chamber and connected therewith, form a central passage, K, having at its front end an opening, L, to which is connected by a collar the inverted funnel M, arranged under the stove, for the purpose of taking in cold air from the floor of the room and conducting the same through a flue or passage in the chamber H, about to be described. The chamber H is formed with an inverted-V-shaped passage, J, by means of the vertical partition-walls I I, meeting at their upper ends, and connected at their lower ends with the side walls, E E², of the chamber K, as shown in Fig. 2 of the drawings. This passage J, thus formed, has a communication with the cold-air passage K, and connection is made or cut off by a damper, N, for controlling the supply of cold air to the fire-chamber through the opening O in rear of the fire-pot. The partition-walls I divide the chamber H into two other compartments or flues, R and Q. The flue Q has an opening, S, near its top, leading into the combustion-chamber. The flue R has, near its upper end, an opening, T, communicating with the combustion-chamber, and is capable of being closed by a damper, U. It also communicates with the pipe V, leading to the chimney. At or near the lower end of the flue R is a plurality of openings, W, leading into the ash-pit, and is capable of being closed by a damper or slide, X, as shown, to control the supply of cold air directly below the fire-pot and on a level with the ash-pan. Thus, by operating the damper X, cold air is supplied below the fire-pot, and, by means of the opening O, it is supplied on a line with the same, so as to enable the fire to burn freely and steadily.

The operation of my invention will be readily understood by those skilled in the art to which it appertains by reference to the annexed drawings. The cold air will be taken up directly from the floor of the room through the funnel M into the passage K, from whence it passes into the V-shaped passage J, and by means of the damper X and opening O the cold air is supplied both below and on a line with the fire-pot. The opening S of the flue Q supplies cold air directly to the combustion-chamber, while the damper U controls the passage of the heated gases and smoke from the combustion-chamber to the flue R, and thence out through the pipe V to the chimney.

It will thus be seen that I am enabled to provide a stove in which the cold air will be taken up directly from the floor and distributed to the fire-pot and combustion-chamber, so that a brisk and lively fire will be insured.

What I claim as new, and desire to secure by Letters Patent, is—

1. In a heating-stove, the combination of the chamber D, provided with the passage K, supplied with cold air from the floor, with the rear chamber, H, provided with the passage J, opening into the fire-box and communicating with the passage K, flue R, provided with openings W, leading to the ash-pit, and having a cut-off or damper, and openings S T in the flues Q R, respectively, the opening T having a damper, U, as set forth.

2. In a heating-stove, the combination, with the chamber D, provided with the passage K, supplied with cold air from the floor, of the rear vertical chamber, H, divided into three compartments, J R Q, the passage or compartment J opening into the fire-box and communicating with the chamber D, and the compartments or flues R Q communicating with the combustion-chamber, as set forth.

3. In a heating-stove, the combination, with the chamber D, provided with the passage K, supplied with cold air from the floor, of the rear chamber, H, provided with the passage J, opening into the fire-box and communicating with the passage K, and the openings W, leading to the ash-pit below the fire-pot, and having a cut-off or damper, as set forth.

4. In a heating-stove, the combination of the horizontal chamber D, provided with the passage K, having at its front end the opening L and inverted funnel M, the rear vertical chamber, H, provided with the passage J, opening into the fire-box and communicating with the passage K in the chamber D, and the cut-off N, substantially as described.

In testimony that I claim the foregoing as my own I have hereto affixed my signature in presence of two witnesses.

BENJAMIN F. STOCKFORD.

Witnesses:
NELSON I. PACKARD,
WM. M. ALLMAN.